United States Patent [19]
Moore

[11] Patent Number: 6,161,325
[45] Date of Patent: Dec. 19, 2000

[54] FISH LURE

[76] Inventor: Jeffery Moore, Rte. 1, Box 200, Fuquay-Varina, N.C. 27526

[21] Appl. No.: 08/410,496

[22] Filed: Mar. 24, 1995

[51] Int. Cl.[7] .................................................. A01K 85/00
[52] U.S. Cl. ........................................ 43/42.5; 43/42.13
[58] Field of Search ................... 43/42.5, 42.51, 43/42.13, 42.14, 42.18

[56] References Cited

U.S. PATENT DOCUMENTS

| | | | |
|---|---|---|---|
| 2,244,378 | 6/1941 | Turner | 43/42.14 |
| 2,665,516 | 1/1954 | Race | 43/42.51 |
| 3,145,497 | 8/1964 | Aho | 43/42.5 |
| 3,418,744 | 12/1968 | Panicci | 43/42.5 |
| 3,673,728 | 7/1972 | Danbrova | 43/42.51 |
| 4,174,584 | 11/1979 | Howard | 43/42.5 |
| 4,475,302 | 10/1984 | Jakeway | 43/42.5 |
| 4,501,087 | 2/1985 | Blomquist | 43/42.51 |
| 4,854,071 | 8/1989 | Kendall | 43/42.5 |
| 4,891,901 | 1/1990 | Baker | 43/42.13 |

*Primary Examiner*—Kurt Rowan
*Attorney, Agent, or Firm*—Coats & Bennett, PLLC

[57] ABSTRACT

The present invention provides an artificial, bi-parabolic fish lure made from a flat, solid strip of sheet material of a uniform thickness having three segments that smoothly transition from one to the next. A relatively long, parabolic anterior section that makes up about three-fifths of the fish lure's length. Next is a circumvoluted middle section comprising about one-fifth of the total length and causes the lure to spin through the water like a propeller when pulled behind a fishing line. A relatively short, parabolic posterior section that also makes up about one-fifth of the total length. The fish lure has a center of gravity rearward of its longitudinal center. In a preferred embodiment, the fish lure is made of shiny metal and is stippled with numerous indentations resembling scales so that the fish lure closely resembles a minnow.

15 Claims, 2 Drawing Sheets

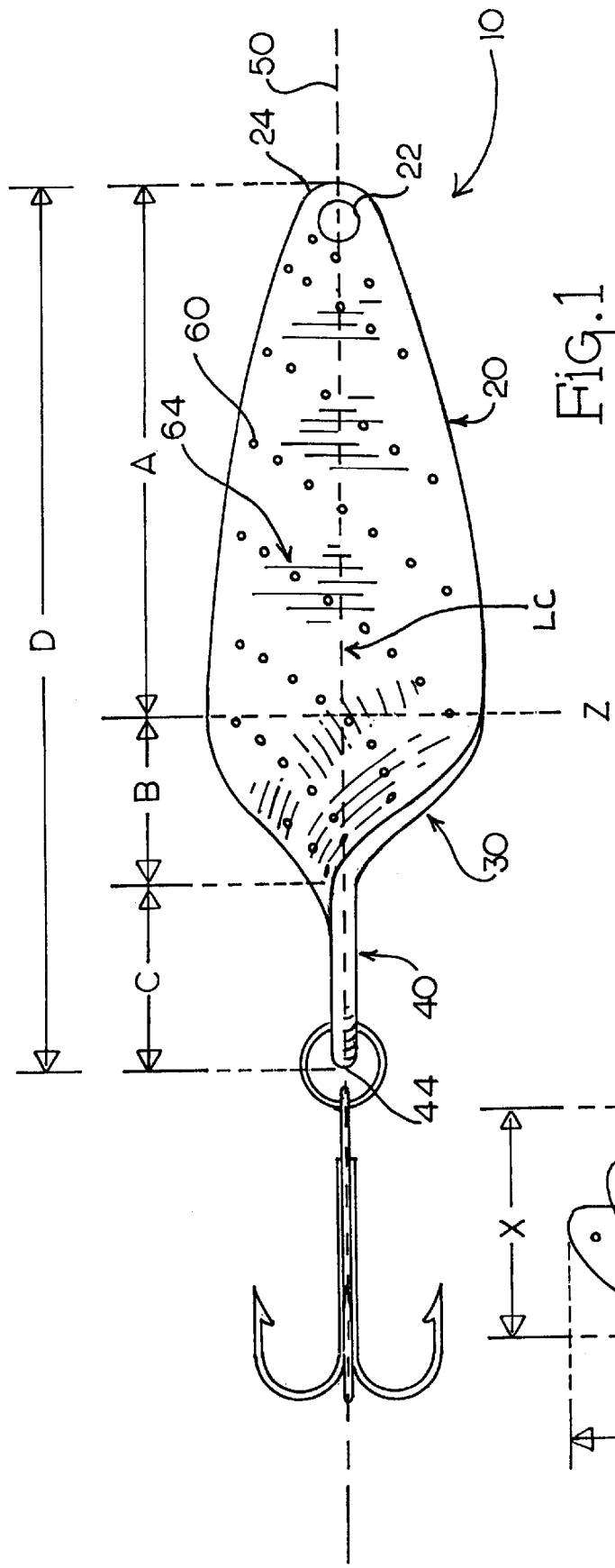
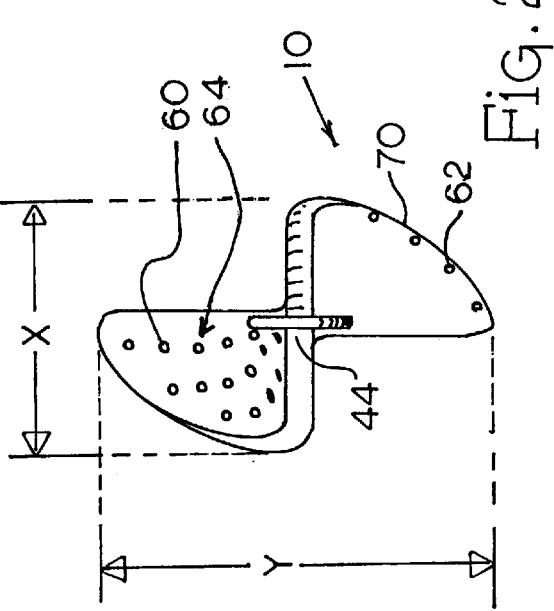

FISH LURE

FIELD OF THE INVENTION

The present on pertains to artificial fish lures and particularly pertains to an artificial fish lure having an elongated, bi-parabolic body strip with a central circumvoluted section and ends that are twisted 90 degrees with respect to one other.

BACKGROUND OF THE INVENTION

Many different types and shapes of artificial fish lures have been invented, and many such lures have been proved effective in catching fish. Some lures have been developed that simulate a minnow or other small fish, which are often the natural prey of larger fish, which in turn are the prey of fishermen. Such lures have been constructed of a material having a metallic sheen so as to resemble a minnow to predator fish. Such lures have also been provided with a helical shape so as to twist or rotate in the water, thereby reflecting flashes of light that hopefully attract large fish.

It has been shown that the most effective fish lures are the ones that most closely mimic a minnow's smooth flight through water, without an undue amount of turbulence that tends to frighten away game fish more than it attracts them. Aeronautical physics has demonstrated that one of the most aerodynamic shapes possible for a projectile traveling through air is a parabola. In the field of physics, a fluid is defined to include matter in a gaseous or liquid state, and the physics of solid bodies traveling through fluids is essentially the same whether the fluid is a liquid or a gas. Accordingly, hydrodynamic physics has demonstrated that parabolically shaped projectiles most efficiently pass through water. This is why rocket fins and plane wings have parabolic cross-sections. This is also why fish and other aquatic animals have naturally evolved with a generally bilaterally symmetrical, parabolic morphology.

It is another principle that a projectile will better travel through a fluid in a true, linear vector if the projectile's center of gravity is forward of its longitudinal center. If the center of gravity is rearward of its longitudinal center, the longitudinal axis of the projectile will not always remain coaxial with the line of travel but will tend to wag somewhat unless the projectile is stabilized by correcting fins, vanes, or the like. In terms of a fishing lure's motion, it is advantageous for a fishing lure to slightly wag so as to better simulate the motion of a real minnow swimming through the water.

Several other designs of fish lures made of variously shaped, twisted strips include the fish lures disclosed in the United States patents to: Danbrova, U.S. Pat. No. 3,673,728; Howard, U.S. Pat. No. 4,174,584; Howard, U.S. Pat. No. 4,075,778; Colangelo, U.S. Pat. No. 3,197,910; Hancock, U.S. Pat. No. 2,653,409; Race, U.S. Pat. No. 2,665,516; Mathie, U.S. Pat. No. 2,256,346; Panicci, U.S. Pat. No. 3,418,744; Greve, U.S. Des. Pat. No. 335,518; and Obst, U.S. Des. Pat. No. 269,365. However, none of the aforementioned patents disclose the present fish lure's hydrodynamically curved configuration, which includes a relatively long, parabolic front end, a 90-degree circumvoluted middle section, and a relatively short, parabolic trailing end. Also, none of the aforementioned patents show a fishing lure having a rearward center of gravity, which will cause a more natural movement of the lure through water.

SUMMARY AND OBJECTS OF THE INVENTION

The present invention provides a unique artificial fish lure that simulates a frightened or wounded minnow when pulled through or over the water on the end of a fishing line. The fish lure is made of a flat strip of a relatively dense sheet of waterproof material, such as metal or plastic, and in a preferred embodiment is made of a material that has a metallic sheen, preferably silver or gold, so as to mimic a minnow or other small fish when in the water. In a preferred embodiment, the strip is of a uniform thickness throughout and is stippled with rows of numerous small indentations on one or both sides.

The fish lure of the present invention can be described as generally having three segments or regions. A relatively long, parabolic anterior section makes up the head end of the fish lure, comprising approximately three-fifths of the fish lure's total length. Next, a circumvoluted, twisted abdominal section makes up approximately the fourth one-fifth of the fish lure's total length. In a preferred embodiment, the circumvoluted abdominal section is twisted approximately 90 degrees around the longitudinal axis of the fish lure. Finally, a relatively short, parabolic posterior section makes up the tail end of the fish lure, comprising approximately one-fifth of the fish lure's total length. A hole is defined at each end to attach a fish hook at the tail end and a fishing line to the head end.

The fish lure of the present invention is configured with the circumvoluted middle section so that it will spin like a propeller when pulled through the water. This motion, in combination with the metallic sheen and stippled surface, causes the fish lure of the invention to reflect flashes of light that tend to arouse the curiosity of larger fish, such as bass, crappie, or bream, by mimicking the appearance of a dying or wounded minnow.

The fish lure of the present invention is also configured to optimize the hydrodynamic properties desired in a good fish lure by minimizing turbulence and more effectively attracting fish. The three segments of the fish lure transition smoothly from one to the next, without any drag-inducing angles or demarcations present in many prior art fish lures. In the preferred embodiment, the present fish lure is generally parabolic at both ends, in contrast to prior art designs that are merely rounded off in a circular arc, are pointed, or are blunt and angled. Also, in the preferred embodiment, the fish lure has a rearward center of gravity so that its passage through water when pulled on the end of a fishing line will better mimic the natural movements of a minnow.

In view of the above, it is an object of the present invention to provide a fish lure having an optimally hydrodynamic morphology so that it travels through water with as little disruption and turbulence as possible so as to not frighten away fish.

It is another object of the present invention to provide a fish lure having a bi-parabolic morphology so that it closely resembles the natural shape of a minnow and so that it passes cleanly through the water.

It is another object of the present invention to provide a fish lure having a rearward center of gravity so that when pulled through the water, its longitudinal axis will not always remain coaxial with the lure's direction of travel, but will wag slightly so as to better imitate the natural swimming movements of a fish.

It is another object of the present invention to provide a fish lure having a metallic sheen and a stippled surface to imitate the shimmer of genuine fish scales.

Other objects and advantages of the present invention will become apparent and obvious from a study of the following description and the accompanying drawings, which are merely illustrative of such invention.

BRIEF DESCRIPTION OF THE DRAWINGS

FIG. 1 is a side elevational view of a fish lure of the invention showing the relative lengths of the fish lure's three segments.

FIG. 2 is an elevational view of the posterior end of the fish lure showing the degree of twisting about the lure's longitudinal axis.

DETAILED DESCRIPTION OF THE INVENTION

Figure 3:
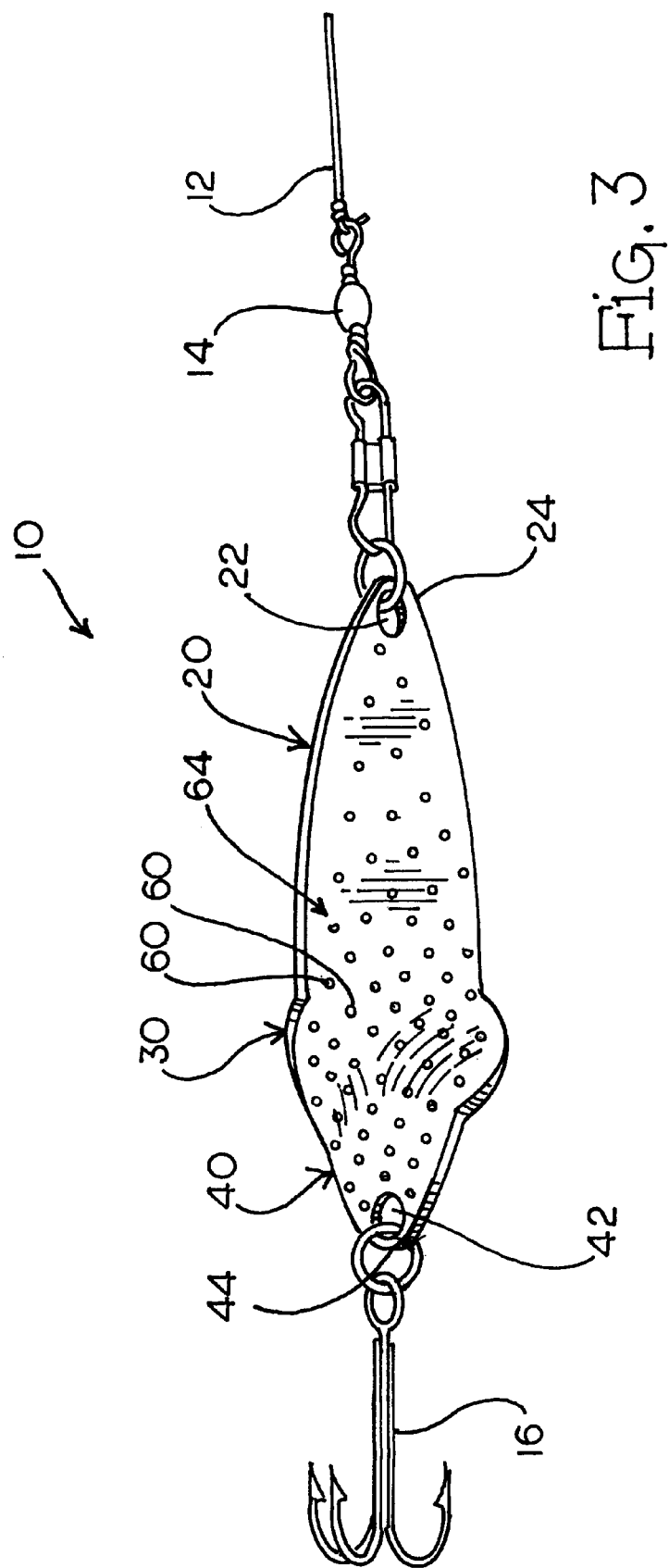
FIG. 3 is a perspective view of the fish lure.

The present invention provides a bi-parabolic fish lure, generally indicated by the numeral 10, which has proved extremely successful in catching fish. Preferably, the fish lure is formed from a relatively thin strip of metal and may be of any size, depending on what type and size of fish is being preyed upon. Alternatively, the fish lure can be made of a plastic material or other material having a specific gravity lower than water so that it will float on the surface. It should be appreciated that any type of hook and line may be used with the fish lure of the invention, also depending on what type and size of fish is being preyed upon. Turning to the drawings, the fish lure 10 has three sections, a parabolic anterior section 20, a circumvoluted abdominal section 30, and a parabolic posterior section 40.

The three sections 10, 20, and 30 transition smoothly from one to the next without any drag-inducing angles or sharp demarcations. The anterior section 20 is relatively long, comprising approximately three-fifths of the total length of the fish lure 10. This is illustrated in FIG. 1, which shows the length of the anterior section 20 indicated by the letter "A" and the total length of the fish lure 10 indicated by the letter "D". At the front end 24 of the anterior section 20 is a hole 22 for attaching the fish lure 10 to a fishing line 12. As should be understood, a spinner device 14 may or may not be used depending on the habits and goals of a particular fisher.

The middle section 30 is relatively short compared to the anterior section 20, comprising approximately one-fifth of the fish lure's total length, as indicated in FIG. 1 by the letter "B". The middle section 30 is twisted approximately 90 degrees around the longitudinal axis of the fish lure 10, as shown in FIG. 2. The twisted middle section is shaped to resemble a propeller so that when the fish lure is pulled through the water, the lure will spin about its longitudinal axis 50.

The parabolic posterior section 40 is also relatively short compared to the anterior section 20, comprising approximately one-fifth of the fish lure's total length, as indicated in FIG. 1 by the letter "C". At the rear end 44 of the posterior section 40 is a hole 42 for attaching a fish hook 16 to the fish lure 10. While any type of hook may be used, a triple hook is preferable.

The posterior section 40 is dimensioned smaller than the anterior section 20, not only in length (compare "A" to "C"), but also in width. The widest dimension of the anterior section 20, where it joins the middle section 30, is indicated in FIG. 2 by the letter "Y". The widest dimension of the posterior section 40, where it joins the middle section 30, is indicated in FIG. 2 by the letter "X". It can be seen that the anterior section's greatest width "Y" is greater than the posterior section's greatest width "X". Thus, the widest portion of the fish lure 10 is at the point "Z" where the anterior section 20 joins the middle section 30. Since this widest point "Z" is three-fifths of the way from the front end 24 of the fish lure 10 to the rear end 44, and therefore more than halfway towards the rear end 44, the fish lure 10 has a center of gravity rearward of its longitudinal center "LC". As explained above, this rearward center of gravity causes the fish lure 10 to wag slightly as it is pulled through the water, so as to closely resemble the natural motion of a real fish.

In a preferred embodiment, both sides of the fish lure 10 are stippled with diagonal rows 64 of small indentations 60. These indentations resemble the scales of a real fish and add to the effectiveness of the fish lure 10 in attracting fish.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An artificial fish lure made from a flat, sheet material, comprising:

(a) a parabolic anterior section having a hole defined in one end for attachment to a fishing line, said parabolic anterior section making up more than one-half of the fish lure's total length. whereby the fish lure's longitudinal center lies within said parabolic anterior section;

(b) a parabolic posterior section having a hole defined in one end for attaching a fish hook;

(c) a circumvoluted middle section of approximately the same length as the posterior section, said circumvoluted middle section disposed rearwards of the fish lure's longitudinal center and connecting the anterior section at an angle to the posterior section; and (d) wherein the fish lure's center of gravity is disposed rearward of the longitudinal center.

2. The artificial fish lure of claim 1 wherein the parabolic anterior section makes up approximately three-fifths of the fish lure's total length, and the circumvoluted middle section and the parabolic posterior section each make up approximately one-fifth of the total length.

3. The artificial fish lure of claim 2 wherein the circumvoluted middle section is twisted approximately 90 degrees around the longitudinal axis of the fish lure.

4. The artificial fish lure of claim 3 wherein the anterior section transitions smoothly and gradually into the middle section, and wherein the middle section transitions smoothly and gradually into the posterior section.

5. The artificial fish lure of claim 4 wherein the sheet material is a metal.

6. The artificial fish lure of claim 4 where in the sheet material is a plastic.

7. The artificial fish lure of claim 5 wherein the fish lure is stippled on its surface with a plurality of indentations.

8. An artificial fish lure made from a sheet material, comprising:

(a) a parabolic anterior section having a hole therethrough for attachment to a fishing line said parabolic anterior section making up approximately three-fifths of the fish lure's total length such that the fish lure's longitudinal center lies within said parabolic anterior section;

(b) a parabolic posterior section having a hole therethrough for attaching a fish hook said parabolic posterior section making up approximately one-fifth of the fish lure's total length;

(c) a circumvoluted middle section disposed rearwards of the fish lure's longitudinal center and connecting the anterior section at an angle to the posterior section said circumvoluted middle section making up approximately one-fifth of the fish lure's total length;

(d) wherein the fish lure's center of gravity is rearwards of its longitudinal center; and (e) wherein the widest dimension of the parabolic anterior section is rearwards of the longitudinal center.

9. The artificial fish lure of claim 8 wherein the circumvoluted middle section is twisted approximately 90 degrees along the longitudinal axis of the fish lure.

10. The artificial fish lure of claim 9 wherein the anterior section transitions smoothly and gradually into the middle section, and wherein the middle section transitions smoothly and gradually into the posterior section.

11. The artificial fish lure of claim 10 wherein the sheet material is a metal.

12. The artificial fish lure of claim 10 wherein the sheet material is a plastic.

13. The artificial fish lure of claim 11 wherein the fish lure is stippled on its surface with a plurality of indentations.

14. The artificial fish lure of claim 8 wherein the hole for attachment to a fish line and the hole for attaching a fish hook are the only holes in the fish lure.

15. The artificial fish lure of claim 8 wherein the widest dimension of the parabolic anterior section is wider than the widest dimension of the parabolic posterior section.

* * * * *